United States Patent [19]
Boldt et al.

[11] Patent Number: 5,506,989
[45] Date of Patent: Apr. 9, 1996

[54] ARBITRATION SYSTEM LIMITING HIGH PRIORITY SUCCESSIVE GRANTS

[75] Inventors: Gerald D. Boldt, Longmont; Stephen D. Hanna, Boulder, both of Colo.

[73] Assignee: IBM Corporation, Armonk, N.Y.

[21] Appl. No.: 473,014

[22] Filed: Jan. 31, 1990

[51] Int. Cl.$^6$ .................................................. G00F 13/14
[52] U.S. Cl. .......................... 395/732; 364/DIG. 1; 364/242.6; 364/242.8; 364/242.93
[58] Field of Search .................................. 395/325, 725, 395/275

[56] References Cited

U.S. PATENT DOCUMENTS

| | | | |
|---|---|---|---|
| 3,840,859 | 10/1974 | Vigil et al. | 340/172.5 |
| 4,554,628 | 11/1985 | Beu | 395/325 |
| 4,920,486 | 4/1990 | Nielsen | 395/325 |

OTHER PUBLICATIONS

Research Disclosure, No. 271, Nov. 1986, Havant GB, "Algorithm for Arbitration Priority Adjustment", p. 668.

Primary Examiner—Christopher B. Shin
Assistant Examiner—Lance L. Barry
Attorney, Agent, or Firm—Carl M. Wright; Saul A. Seinberg

[57] ABSTRACT

Priority levels and bump values are assigned to requestors for access to a system resource. When access requests are received, arbitration of the requests is made in accordance with the assigned priorities, bump values, and the received access requests. If a high priority level access request is granted, then the same request will be held off for a successive number of requests as set by the bump values. In cases where the access is required for more than one request/grant cycle, the priority level access can be retained as long as required.

2 Claims, 3 Drawing Sheets

| | STATE A | STATE B | STATE C | STATE D | LSP | ACMODE | DMAREQ | HOLD | VXREQ | SELECT A | SELECT B | SELECT C | SELECT D | DMAREQ | PGNT |
|---|---|---|---|---|---|---|---|---|---|---|---|---|---|---|---|
| 1 | 1 |  |  |  | 1 | 0 |  |  |  | X |  |  |  |  |  |
| 2 | 1 | 1 |  |  |  | 0 | 0 | 1 | 1 |  | X |  |  |  |  |
| 3 | 1 | 1 |  |  |  | 0 | 0 | 0 |  |  | X |  |  |  |  |
| 4 | 1 |  |  |  |  | 0 | 0 | 1 | 0 |  |  | X |  |  |  |
| 5 |  | 1 |  |  |  | 0 | 0 | 1 | 1 |  | X |  |  |  |  |
| 6 |  | 1 |  |  |  | 0 | 0 | 0 |  |  | X |  |  |  |  |
| 7 |  | 1 |  |  |  | 0 | 0 | 1 | 0 |  |  |  | X |  |  |
| 8 |  |  | 1 |  |  |  |  |  | 1 |  |  |  |  | X | X |
| 9 |  |  | 1 |  |  | 0 |  |  | 1 |  |  |  | X |  |  |
| 10 |  |  | 1 |  |  | 1 | 0 |  |  | X |  |  |  |  |  |
| 11 |  |  | 1 |  |  | 0 | 0 |  |  | X |  |  |  |  |  |
| 12 |  |  | 1 |  |  | 0 | 0 | 1 | 1 |  | X |  |  |  |  |
| 13 |  |  | 1 |  |  | 0 | 0 | 0 |  |  | X |  |  |  |  |
| 14 |  |  | 1 |  |  | 0 | 0 | 1 | 0 |  |  |  | X |  |  |
| 15 | 1 |  |  |  |  | 0 | 0 | 1 |  | X |  |  |  |  |  |
| 16 | 1 |  |  |  |  | 0 | 0 | 0 |  | X |  |  |  |  |  |
| 17 |  |  |  |  |  | 1 | 0 |  |  |  |  |  |  | X | X |
| 18 |  |  |  | 1 |  | 0 | 0 | 1 |  | X |  |  |  |  |  |
| 19 |  |  |  | 1 |  | 0 | 0 | 0 |  | X |  |  |  |  |  |
| 20 |  |  |  | 1 |  | 0 | 1 | 1 |  |  | X |  |  |  |  |
| 21 |  |  |  | 1 |  | 0 |  | 0 |  |  | X |  |  |  |  |
| 22 |  |  |  | 1 |  |  |  | 1 |  |  | X |  |  |  |  |

FIG. 4

ARBITRATION SYSTEM LIMITING HIGH PRIORITY SUCCESSIVE GRANTS

BACKGROUND AND SUMMARY OF THE INVENTION

This invention relates to arbitrations of priority requests for access to system resources and particularly to bus arbitration, especially star bus arbitration, a process for resolving the assignment of one of a plurality of simultaneous requestors for access to a system resource, usually a system bus. Once a requestor (device or processor) is given control of the resource, it can occupy it until the task is completed or for a predetermined period of time.

Electronic computer systems usually require that the processor have access to input and output devices for useful functioning. For most efficient operation, such devices operate independently from the central processor. That is, unlike early computer systems where the devices were controlled by the central processing unit, modern design moves the processing function into the device, permitting the central processor and the devices to function simultaneously and independently. At times, however, the devices must access resources shared with other devices and with the central processor. For example, the main memory is often a shared resource and is accessed via a system bus. The central processor operates on data stored in the memory and some devices are used to store data from outside the system into the memory for processing while other devices read data from the memory for use outside the system, e.g., printing the results of computation and processing.

To reduce interference with the workings of the central processor, a technique known as Direct Memory Access (DMA) is used to enable devices to read from or to write to the memory without requiring the central processor's intervention. The address of the data location in memory is stored in the device (or a channel through which the device operates) and used to address the memory during one or more cycles while the central processor and other devices are inhibited from accessing the memory. The DMA process operates as an interrupt procedure, so called because it doesn't always require access to the memory on a regular, periodic basis and interrupts the central system for access asynchronously. Such a process is also called cycle stealing.

All the devices, including the central processor, cannot access the memory bus simultaneously because there would be no way to distinguish the separate signals. Therefore, resource requests must be arbitrated in a way that fulfills the requirements of all the devices. Some devices operate at higher data rates than others. For example, a disk storage device can read and write data at a faster rate than a paper tape device. As a result, the high speed device needs faster and more frequent accesses to the memory bus than slow speed devices. Therefore, priority of access among devices is necessary.

The assignment of priorities to individual devices in a system is based on more than speed considerations. It is also necessary to prevent one or more high priority devices from crowding out a lower priority device to the extent that the latter does not obtain access to the systems resources sufficiently for proper operation or often enough resulting in lost data.

Using fixed priority schemes with hardware implementation has the advantage of high speed arbitration without interfering with the operation of the central processor. Using variable priority schemes under control of the central processor is more flexible but is slower and requires intervention of the central processor.

Several techniques of varying priority assignments have been developed including rotating priority among devices, using serial or polling procedures, and other complicated methods.

U.S. Pat. No. 4,229,791 discloses the use of individual arbitration circuits for controlling access to a common bus. Each circuit has a preassigned priority level but can be added or removed from the system or disabled without affecting the operation of the other units.

U.S. Pat. No. 4,257,095 discloses a shared system bus having an arbitration circuit that allows a lower priority device to access the system during times when a higher priority device, which has control of the system bus, is idle or accessing a bus other than the system bus.

U.S. Pat. No. 4,499,538 discloses a parallel, asynchronous arbitration of access requests which can be fixed priority, cyclic sequential, or mixed priority.

U.S. Pat. No. 4,716,523 discloses a programmably selective data transfer mode whereby the data transfer can be DMA mode or interrupt driven mode. DMA and character interrupt requests are arbitrated to pass control to a DMA controller or a character interrupt controller.

U.S. Pat. No. 4,418,974 discloses a priority system which stores the priority assignments in fixed memory locations with an addressing arrangement for addressing the memory locations cyclically and granting priority based on information stored with the priority assignments.

The invention avoids the disadvantages of a software-only or a hardware-only system by combining the advantages of both. It also avoids the problem of freezing out a slow, low priority requestor by limiting the number of successive accesses granted to the high priority requestors.

The invention has the ability to assign multiple requestors at the same priority level and resolve any conflicts while assigning a limit to the number of requestor's successive accesses, all during a single request/grant cycle.

In accordance with the invention, a system assigns priority access levels and sets associated bump values. When access requests are received, arbitration of the requests is made in accordance with the assigned priorities, bump values, and the received access requests. If a high priority level access request is granted, then the same request will be held off for a successive number of access grants as set by the bump values. In cases where access is required for more than one successive request/grant cycle, the priority level access can be retained as long as required.

BRIEF DESCRIPTION OF THE DRAWING

The invention is described in detail by referring to the various figures which illustrate specific embodiments of the invention, and wherein like numerals refer to like elements.

FIG. 4 is a table specifying the state machine controlling the arbitration logic.

DESCRIPTION OF THE PREFERRED EMBODIMENT

Figure 1:
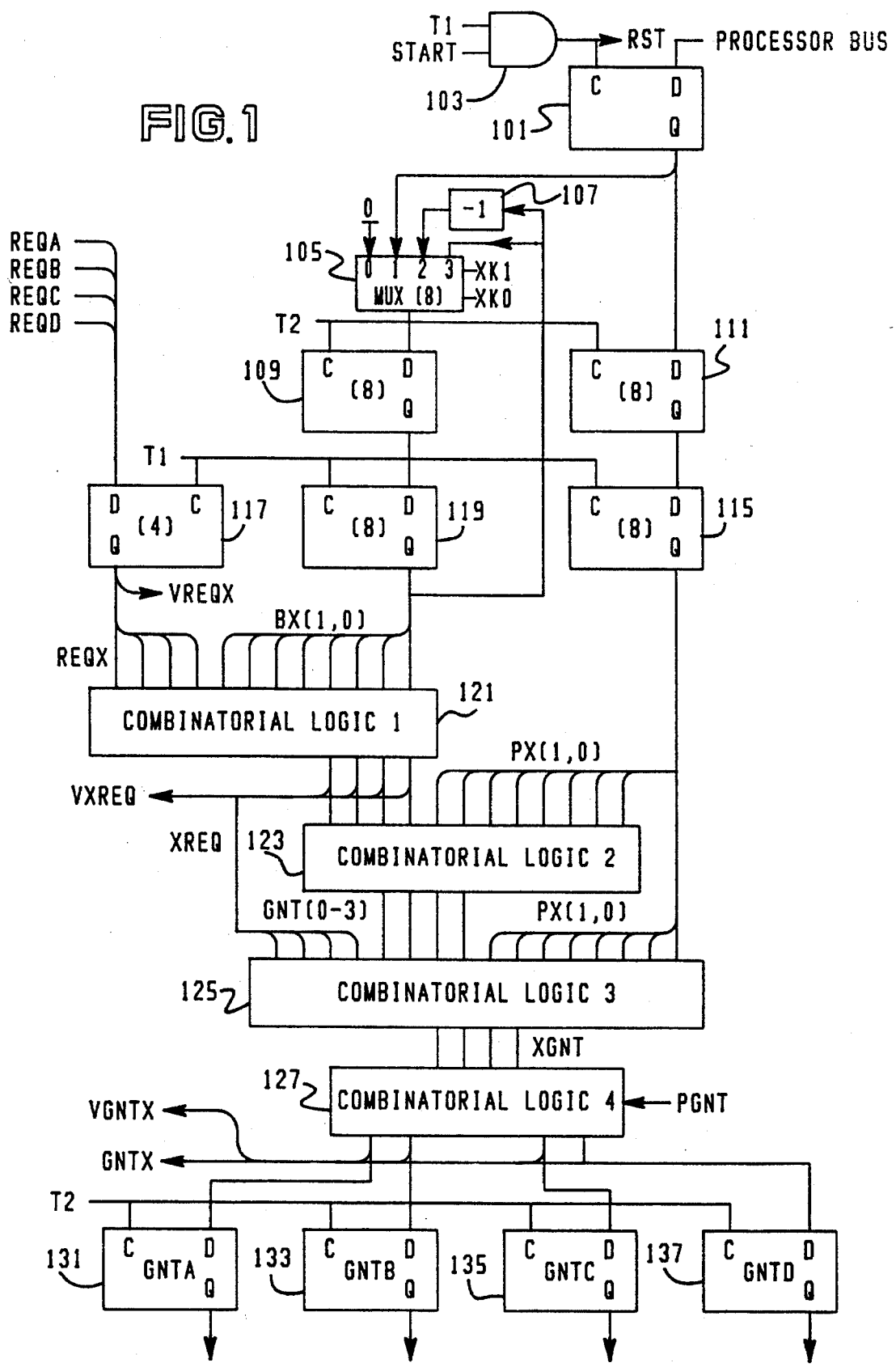
FIG. 1 is a block diagram of the arbitration logic.

The following definitions are supplied to make the description of the preferred embodiment more clear and concise.

A bus master is a circuit capable of accessing and controlling at least one associated bus and which must access a bus for proper operation, e.g., direct memory transfers (DMA) for exchanging data between a system memory and an input/output device without the intervention of the system processor.

Star arbitration is a priority request system receiving access requests in parallel, and one of several parallel requests results in an access grant to the requestor having the highest priority or according to some other criteria.

The star arbitration system being described has four bus masters which compete in any combination and order for control of a bus. The limit to four bus masters makes the system description easier to understand, but the system can be expanded to any number of bus masters. The notation used makes the expansion of the system to more than four requestors clear and assists in the understanding of the description. The system described for bus access is applicable to other systems having multiple requestors for access to system resources in general.

The star arbitration system according to the invention has programmable variables which can be set by an associated processor. The programmable features include a priority level assignment to each bus master and a bump value associated with each bus master which controls a bus lock function. The system can resolve conflicts caused by the same priority level being assigned to more than one bus master.

The bump value determines the number of request/grant cycles a higher priority bus master must relinquish to other bus masters requesting access to the bus.

The bus masters in the following description are limited to four, denoted as A, B, C, or D and represented generally as X. Each has a separate request line, REQX, and a separate grant line, GNTX. Each bus master has an assigned priority, PX(1,0), i.e., a two-bit binary number. The value 00, or decimal 0, represents the highest priority and the value 11, decimal 3, is the lowest priority. The priorities assigned to the bus masters need not be mutually exclusive. In other words, different bus masters can be assigned the same priority level.

Each bus master also has an assigned bump value, BX(1, 0), a two-bit binary number for purposes of illustration. The bump value assigned to a bus master sets the number of request/grant cycles the bus master must relinquish to other bus masters if and only if other requests are pending.

The priority levels and bump values are supplied by the control processor over a processor bus. A two-phase clock is used for timing and the system is arranged so that the priority granted in response to requests is completed in one request/grant cycle by using a multilevel logic network.

Although PX and BX are described as two-bit values, they can be expanded to any number of bits. When a priority request is granted to X, a signal GPX is set and remains set for the number of request/grant cycles represented by the bump value, BX(1,0). The setting of GPX effectively causes the priority level of the associated X bus master to be bumped down by one level, e.g., from level 0 to level 1. If another bus master gets control of the bus, then the bump value is decremented at each request/grant cycle until it reaches zero, permitting the associated bus master to obtain control of the bus once again, or when the other bus masters requesting access have been bumped to the same priority level. In other words, the bump value sets the number of request/grant cycles that other bus masters can get control of the bus between successive accesses by each bus master. The value of BX is 1) decremented if a new bus master obtains control of the bus,
2) set to zero if no bus master requests control of the bus, and
3) set to its original value if the associated bus master obtains control of the bus.

If two bus masters have the same assigned priority or a conflict results, then priority is granted alphabetically. That is, A precedes B, B precedes C, and so on. This is determined by the way the request lines are connected to the logic.

Two programmable operation modes are provided. One is a nonoverlap mode, ACMODE=1, which allows the processor to access the bus more frequently and the other is the overlap mode, ACMODE=0, which can handle successive priority requests more efficiently. The mode can be set depending on whether a large number of processor memory accesses are anticipated or a large number of priority requests will be required, e.g., loading large amounts of data such as page buffers.

In the following description, "&" represents the logical AND operation; "v", the logical OR operation; "@", the logical Exclusive-OR operation; and, "'", the logical NOT operation.

The letter X represents, in the preferred embodiment, the variable identifiers A, B, C, and D. For example, REQX represents four signals, viz., REQA, REQB, REQC, and REQD. This permits a notation to be used that is general in nature and which encompasses any number of variable identifiers. For example, in an embodiment requiring eight request levels, REQX can represent REQA through REQH. The priority and bump values can also employ more than two bits (binary digits). The notation used also makes the invention more easily understood.

Two time pulses, T1 and T2, alternate, comprising a two-phase clock for timing purposes.

FIG. 1 shows the logic diagram for the arbitration network. A bus latch 101, comprising a plurality of flip-flops, is used to initiate the process by storing bits from a processor bus in response to a START signal gated by a time pulse T1 via an AND gate 103. The output signal from the AND gate 103 is also used as a RST signal by the control logic.

In the embodiment being described, eight bits (two bits per bus master) form the bump values which are gated into an eight-bit register 109 via a multiplexor 105. That is, the stored bits from the register 101 are gated via the multiplexor 105 into the register 109 by a time pulse T2. At the same time, eight bits denoting priority assignments are gated into a register 111. At a time T1, the contents of the register 109 are gated into a register 119 and the contents of the register 111 are gated into a register 115.

The same T1 timing pulse also stores in a four-bit register 117 active priority request signals REQA, REQB, REQC, or REQD. These signals are denoted collectively as REQX and are ORed together to generate a VREQX signal for use by the control logic.

Between time pulse T1 and the next time pulse T2, signals from the registers 115, 117, and 119 pass through four levels of combinatorial logic. The combinatorial logic at the fourth level 127 generates a new priority grant gated by a timing signal, PGNT. The output signals from the combinatorial logic fourth level 127 are gated into flip-flops 131, 133, 135, and 137 by a time pulse T2.

The combinatorial logic first level 121 combines the bump value bits, BX(1,0) and the REQX bits to produce four output signals, XREQ.

$$XREQ = REQX \ \& \ (GPX \ \& \ LR)' \qquad (1)$$

where $GPX = BX1 \ v \ BX0$, and $\qquad (2)$ $$LR=v(REQX \& GPX') \quad (3)$$

If the left-hand member of the logic equation contains an X, the expression forming the right-hand member of the logic equation is evaluated four times, successively substituting for X the logic variable identifiers A, B, C, and D.

Equation (1), for example, indicates four logical signals are generated, viz., AREQ, BREQ, CREQ, and DREQ. Each signal component is derived by substituting the same variable identifier in the right-hand member of the equation, e.g., $$AREQ=REQA \& (GPA \& LR)',$$

$$BREQ=REQB \& (GPB \& LR)',$$

and so on.

Equation (3) for LR has no X variable identifier on the left-hand side but X appears in the right-hand expression. The notation used in equation (3) indicates the parenthesized term is ORed for all values of X, i.e., A, B, C, and D. That is, $$LR=(REQA \& GPA') \lor (REQB \& GPB') \lor (REQC \& GPC') \lor (REQD \& GPD').$$

The XREQ signals from the combinatorial logic first level 121 are applied as input signals to the next two levels of combinatorial logic 123 and 125.

The XREQ signals are also ORed to supply a VXREQ signal to the controller to be used in a manner described below in more detail.

The combinatorial logic second level 123 combines the XREQ signals and the PX(1,0) priority signals to produce four output signals, GNT(0–3) as follows:

$$GNT0=REQ0; \quad (4)$$

$$GNT1=REQ1 \& REQ0'; \quad (5)$$

$$GNT2=REQ2 \& (REQ1 \lor REQ0)'; \quad (6)$$

$$GNT3=REQ3 \& (REQ2 \lor REQ1 \lor REQ0)', \quad (7)$$

where $REQn=v (XREQ \& PX (1,0)=n)$, n=0,1,2,3. (8)

Equation (8) is interpreted as ORing the ANDed values of XREQ with the priority bits PX(1,0) that decode to the indicated value of n. For example, $$REQ0=v (XREQ \& PX1' \& PX0') \quad (9)$$

$$=v(XREQ \& (PX1 \lor PX0)') \quad (10)$$

Equation (10) is derived from equation (9) using DeMorgan's Theorem.

Another example of equation (8) using n=2 is $$REQ2 = (AREQ \& (PA1' \lor PA0)') \lor \\ (BREQ \& (PB1' \lor PB0)') \lor \\ (CREQ \& (PC1' \lor PC0)') \lor \\ (DREQ \& (PD1' \lor PD0)'). \quad (11)$$

Equations (4) through (7) can be generalized to $$GNTn=REQn \& v(REQi)' \text{ for } i=0, 1, \ldots, n-1$$

In the combinatorial logic third level 125, the XREQ, GNT (0–3), and PX (1,0) signals are combined to generate four output signals, XGNT, by $$XGNT=XREQ \& v (GNTn \& PX(1,0)=n) \quad (12)$$

The XGNT signals are gated by a control signal PGNT, described below in more detail, to produce a GNTX signal, the final priority grant signal, which is stored in an appropriate flip-flop 131, 133, 135, or 137 by a time pulse T2. The priority grant signals are generated by $$GNTX=PGNT \& XGNT \& (v(YGNT))' \; Y=A, B \ldots, X-1 \quad (13)$$

where Y is a substitute variable, i.e., a dummy variable, for X to denote the ORed value of the logic variable identifiers up to but not including X. For example, $$GNTC=PGNT \& CGNT \& (AGNT \lor BGNT)' \quad (14)$$

The GNTX signals are used by the control logic and are also ORed to generate a VGNTX signal for use by the controller.

The multiplexor 105 represents eight multiplexors in parallel, each controlled by signals XK0 and XK1. That is, there are two bit bump values for each request channel, A, B, C, and D. The multiplexors can reset the registers 109 by gating logical zeros when the values of XK1 and XK0 are zero. When the XK values are one, the bits from the register 101 are gated to the register 109. When the XK values are two, the present bump values in register 119 are decremented and stored in register 109. An XK value of three recycles the previous bump values from the register 119 to the register 109.

Figure 3:
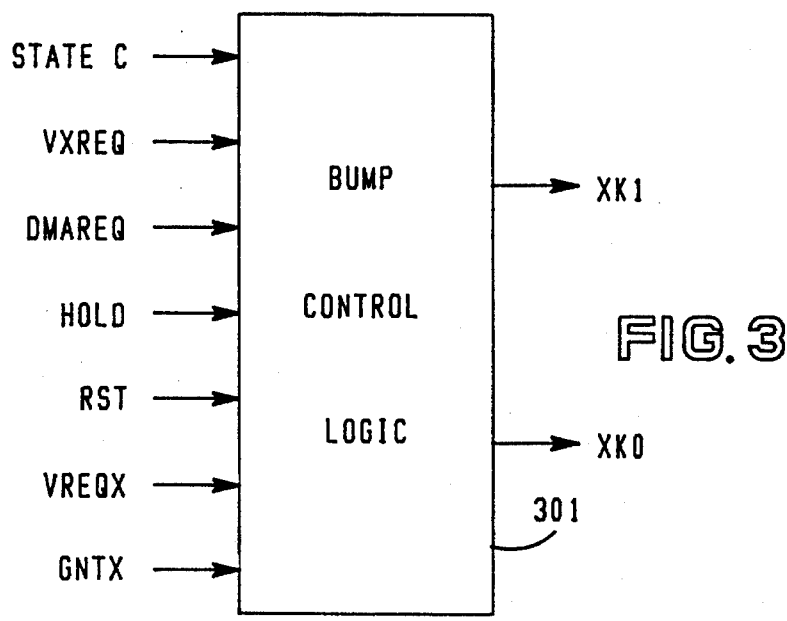
FIG. 3 is a block diagram of the bump logic control.

FIG. 3 shows a block diagram of the bump control logic. The control logic 301 is supplied for each value of X, four in the embodiment being described. All the input signals to the logic 301 are the same for each value of X except for the signal GNTX. The STATE C and DMAREQ signals are supplied by the controller logic as described below in greater detail. The VXREQ and VREQX signals are described above. The HOLD signal is supplied by a controlling processor and can be stored in an additional latch from the processor bins in the register 101 of FIG. 1.

The output signals, XK1 and XK0, from the bump control logic 301 control an associated multiplexor 105 shown in FIG. 1.

The logic equations controlling the multiplexor 105 are:

$$XK=0: v(REQX)' \lor RST \quad (15)$$

$$XK=1: PRI \& XGNT \quad (16)$$

$$XK=2: PRI \& XGNT' \quad (17)$$

$$XK=3: v(REQX) \& RST' \& PRI' \quad (18)$$

$$\text{where } PRI=STATE\ C \& VXREQ \& DMAREQ \& HOLD' \quad (19)$$

From equations (15)–(18), the individual control bit logic equations are derived:

$$XK1=(PRI \& GNTX') \lor (v(REQX) \& RST \& PRI') \quad (20)$$

$$XK0=v(REQX)' \lor RST \lor (PRI \& GNTX) \quad (21)$$

The above equations completely specify the logic network of the bump control logic 301.

The decrementer 107 in FIG. 1, one for each set of bump values, operates according to the following logic equations:

$$BX1^*=(BX1 @ BX0)' \quad (22)$$

$$BX0^*=BX0' \quad (23)$$

where BXn* are the output signals from the decrementer 107 which are gated into the register 109 by time pulse T1.

The source of the signals that make up the PRI signals in equation 19 are from the controller, explained below in detail.

In addition to the priority assignments, PX, and the bump values, BX, supplied by the processor, other signals of interest from the processor include an LSP (Load/Store Pending) signal which indicates that the central processor requires access to the bus. This inhibits priority request grants until the central processor has completed its required bus access.

When a bus master will require control of the bus for more than one request/grant cycle, e.g., for a DMA burst of several request/grant cycles, it supplies a HOLD signal. Similarly, a HOLD signal can be supplied by a resource when it requires several contiguous request/grant cycles.

Figure 2:
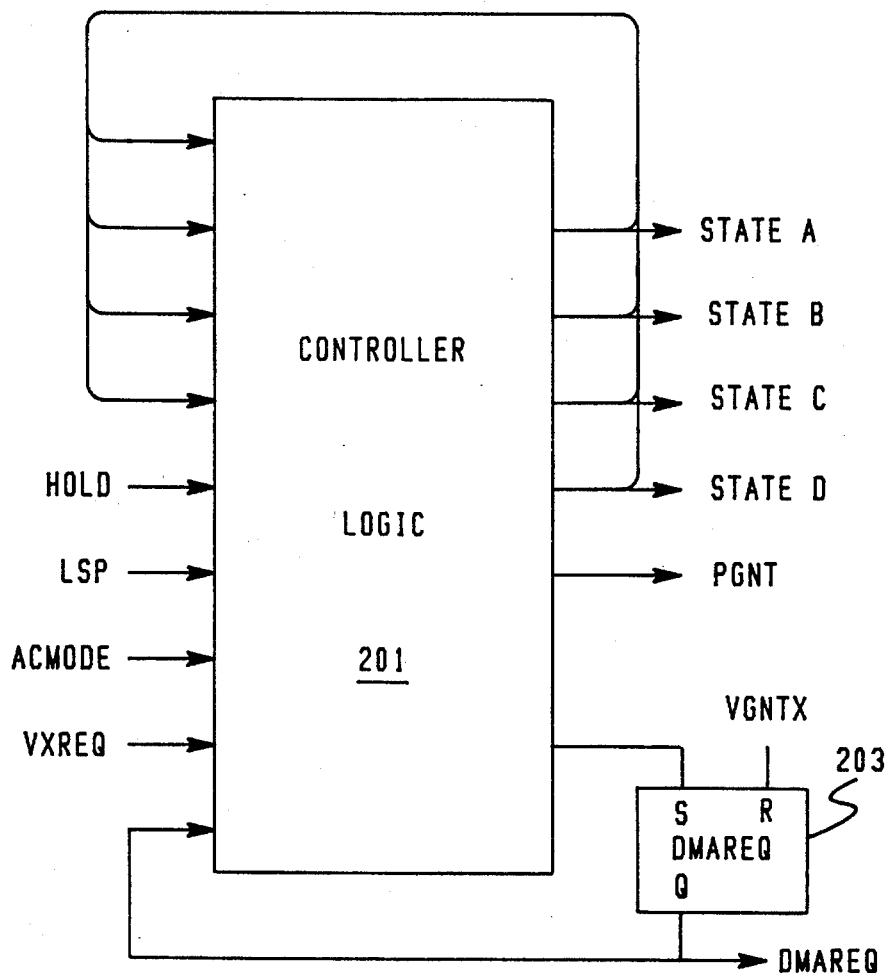
FIG. 2 is a block diagram of the controller for the arbitration apparatus.

These signals control the controller state machine shown in FIG. 2. The controller logic comprises a sequential state machine having four states. The signals of interest from the controller are the PGNT and the DMAREQ signals.

The DMAREQ signal is supplied by the controller when a request has been granted to keep the controller, a state machine, from changing state or granting another request until the bus master granted access has actually assumed control of the bus. The DMAREQ signal is reset when a bus master assumes control of the bus. In the logic of the controller, an output signal from the control logic sets a flip-flop 203 which supplies the DMAREQ signal. The flip-flop 203 is reset when a bus master is granted control of the bus as signified by the VGNTX signal.

The input signals to the controller logic 201 include the present state signal, the signals from the processor (HOLD, LSP, ACMODE), and the VXREQ signal from the arbitration logic of FIG. 1.

The output signals from the controller logic 201 are PGNT and the signal which sets the DMAREQ signal. Other output signals may be required by a complete system but are not of interest nor necessary for the description of the invention.

The controller logic is completely specified by the table of FIG. 4.

The first nine rows of FIG. 4 represent input signals and state signals of the controller.

The bottom six rows of FIG. 4 are the output signals that result from the input and state signals.

The top four rows are the possible machine states. (The state labels of A, B, C, and D are not related and are completely independent from the bus master labels.) In the overlap mode, the controller uses all four states. In the nonoverlap mode, only States A and C are used.

State A is the initial state entered when the machine is first powered on and is the idle state during operation. State B is the waiting or hold-off state. State C is the GO state during which the operations of the hardware are controlled, principally by the generation of the PGNT signal. State D is the gap state and maintains the control signals from State C to provide a smooth transition to the idle state.

In the columns of the first nine rows, a value of 1 indicates the machine is in the state represented by the row in which the 1 appears or that the logic signal represented by the row is true (active). A 0 represents the associated logic signal is false (inactive). A blank entry means the value of the logic signal is not required, commonly referred to as a don't-care value.

In the columns of the bottom six rows, an X indicates that the signal associated with the row in which the X appears is generated. The action is the logical AND result of the variables in the top nine rows of the same column.

For example, the first column shows the controller machine is in State A, the LSP signal is active, and the ACMODE signal is inactive. The action resulting from this combination of signals is to Select A, i.e., cause State A to be the next state. The logic equation represented by the first column is $$SELECT\ A = STATE\ A\ \&\ LSP\ \&\ ACMODE' \qquad (24)$$

The second column represents the action taken when in State A and not in ACMODE and both the DMAREQ and HOLD signals are active while the LSP signal is inactive. The next state selected is State B. That is, $$SELECT\ B = STATE\ A\ \&\ LSP'\ \&\ ACMODE'\ \&\ DMAREQ\ \&\ HOLD)$$

The same signals while in State B cause State B to be selected as the next state, i.e., the controller enters and remains in the wait state.

While in State B, if the LSP signal is active while the ACMODE signal remains inactive, State A is selected.

The actions of interest in the states of the controller of FIG. 4 occur in States C and D when the VXREQ signal is active. These conditions generate the DMAREQ and PGNT signals. These two signals depend only on the state and VXREQ signal.

The last six columns show the state transitions when in the ACMODE. The output signals, DMAREQ and PGNT, are generated only in State C when the VXREQ signal is active. Without the intermediate States B and D, however, the controller machine can respond to contiguous successive request signals.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. An access priority arbitration system comprising, in combination:

means for assigning priority access levels;

means for setting bump values;

means for receiving a plurality of access requests;

means responsive to assigned priority access levels, access requests, and bump values for arbitrating the access request; and means for controlling a mode of operation so that arbitration can be performed faster when a large number of access requests are anticipated.

2. The combination comprising:

a plurality of request lines for supplying request signals indicative of requests for access to resources;

first means for assigning priority levels to each of said plurality of request lines;

second means for assigning a bump value to each of said plurality of request lines;

output means responsive to said first and second means and said request signals for supplying access grant signals to one of said plurality of request lines;

mode means for setting a mode of operation; and means responsive to said mode means for causing said output to supply access grant signals at a different rate.

* * * * *